United States Patent
Berman

(10) Patent No.: US 7,422,329 B2
(45) Date of Patent: *Sep. 9, 2008

(54) LIQUID CRYSTAL ON SILICON (LCOS) KERNEL WITH 3D PROJECTION CAPABILITY

(75) Inventor: Arthur Berman, San Jose, CA (US)

(73) Assignee: LightMaster Systems, Inc., Cupertino, CA (US)

( * ) Notice: Subject to any disclaimer, the term of this patent is extended or adjusted under 35 U.S.C. 154(b) by 203 days.

This patent is subject to a terminal disclaimer.

(21) Appl. No.: 11/171,559

(22) Filed: Jun. 30, 2005

(65) Prior Publication Data

US 2007/0002279 A1    Jan. 4, 2007

(51) Int. Cl.
*G03B 21/14*     (2006.01)

(52) U.S. Cl. .......................................... 353/20; 353/33

(58) Field of Classification Search ............... 353/7–10, 353/20, 33; 359/456, 462, 850, 443, 453, 359/458, 460, 885–892, 487, 478, 465, 464

See application file for complete search history.

(56) References Cited

U.S. PATENT DOCUMENTS

| | | | | |
|---|---|---|---|---|
| 5,822,117 A | * | 10/1998 | Kleinberger et al. | 359/465 |
| 6,375,330 B1 | * | 4/2002 | Mihalakis | 353/31 |
| 6,909,556 B2 | * | 6/2005 | Berman et al. | 359/634 |
| 2002/0001135 A1 | * | 1/2002 | Berman et al. | 359/640 |
| 2002/0080496 A1 | * | 6/2002 | Kaschke et al. | 359/630 |
| 2003/0043346 A1 | * | 3/2003 | Kwok et al. | 353/20 |

* cited by examiner

*Primary Examiner*—Christopher Mahoney
(74) *Attorney, Agent, or Firm*—Martine Penilla & Gencarella, LLP

(57) ABSTRACT

Images to be displayed are produced for left-eye viewing and right-eye viewing in synchronization with a polarization device that alternately changes polarization of the viewed images. In one embodiment, a control mechanism synchronizes modulation performed by microdisplays in a reflective Liquid Crystal On Silicon (LCOS) kernel with an electronically controlled shutter that alternately converts light output from the LCOS kernel between S and P polarizations. Prior to reaching the shutter (or other polarization switching device) a wavelength specific retarder is utilized so that the polarizations of various light channels are homogenous. The kernel installed in, for example, a 3-D enabled monitor, 3-D gaming device, or a 3-D enabled High Definition (HD) LCOS Rear projection television (RPTV). In one embodiment, the LCOS Kernel is an LMS™ LiquidVision™ or LMS AT™ kernel

12 Claims, 6 Drawing Sheets

LIQUID CRYSTAL ON SILICON (LCOS) KERNEL WITH 3D PROJECTION CAPABILITY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The present invention relates to 3 dimensional image production. The present invention is more particularly related to 3D imagery in projection devices, which includes Liquid Crystal on Silicon (LCOS), Rear Projection Televisions (RPTV) and other display devices.

2. Discussion of Background

Method and devices for producing stereoscopic 3D images have been known for years. Early examples include providing left and right images (e.g., photographs) in a device that requires a viewer's right eye to focus on the right image and the viewer's left eye to focus on the left image.

Films have been shown in 3D since at least the 1950's and generally require special glasses (e.g., red and blue lensed glasses so that left and right images are only fully viewed by the left and right eyes of the viewer.

SUMMARY OF THE INVENTION

The present inventor, has realized the need for improved 3D viewing from projectors, televisions, and the like. In one embodiment, the present invention provides a device, comprising, a kernel configured for use in an image projection system, an optical element to homogenize polarizations in an output light channel of the kernel, and a polarization shutter in optical series with the optical element and configured to switch between a first retardation state and a second retardation state.

In another embodiment, the present invention is a projection system comprising an electronically controlled shutter configured to rapidly change polarizations of output light from the projection system between a first polarization state and a second polarization state.

The present invention includes a method, comprising the steps of, synchronizing modulation of a left side image and a first polarization state of a projection system, and synchronizing modulation of a right side image and a second polarization state of the projection system.

In one embodiment, the present invention is a Liquid Crystal On Silicon (LCOS) projection system, comprising, a kernel, comprising a set of optics and a set of reflective LCOS microdisplays, the set of optics configured to split input light into at least 3 light channels and direct each light channel to a reflective LCOS microdisplay and recombine modulated lights reflected from the LCOS microdisplays into an output beam, a wavelength specific retarder configured to homogenize polarizations in the output beam, a polarization switching mechanism disposed in the homogenized output beam and configured to switch a polarization of the output beam, and a control mechanism configured to synchronize image data modulated by the microdisplays with a state of the polarization switching mechanism.

Portions of both the device and method may be conveniently implemented in programming on a general purpose computer, or networked computers, and the results may be displayed on an output device connected to any of the general purpose, networked computers, or transmitted to a remote device for output or display. In addition, any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
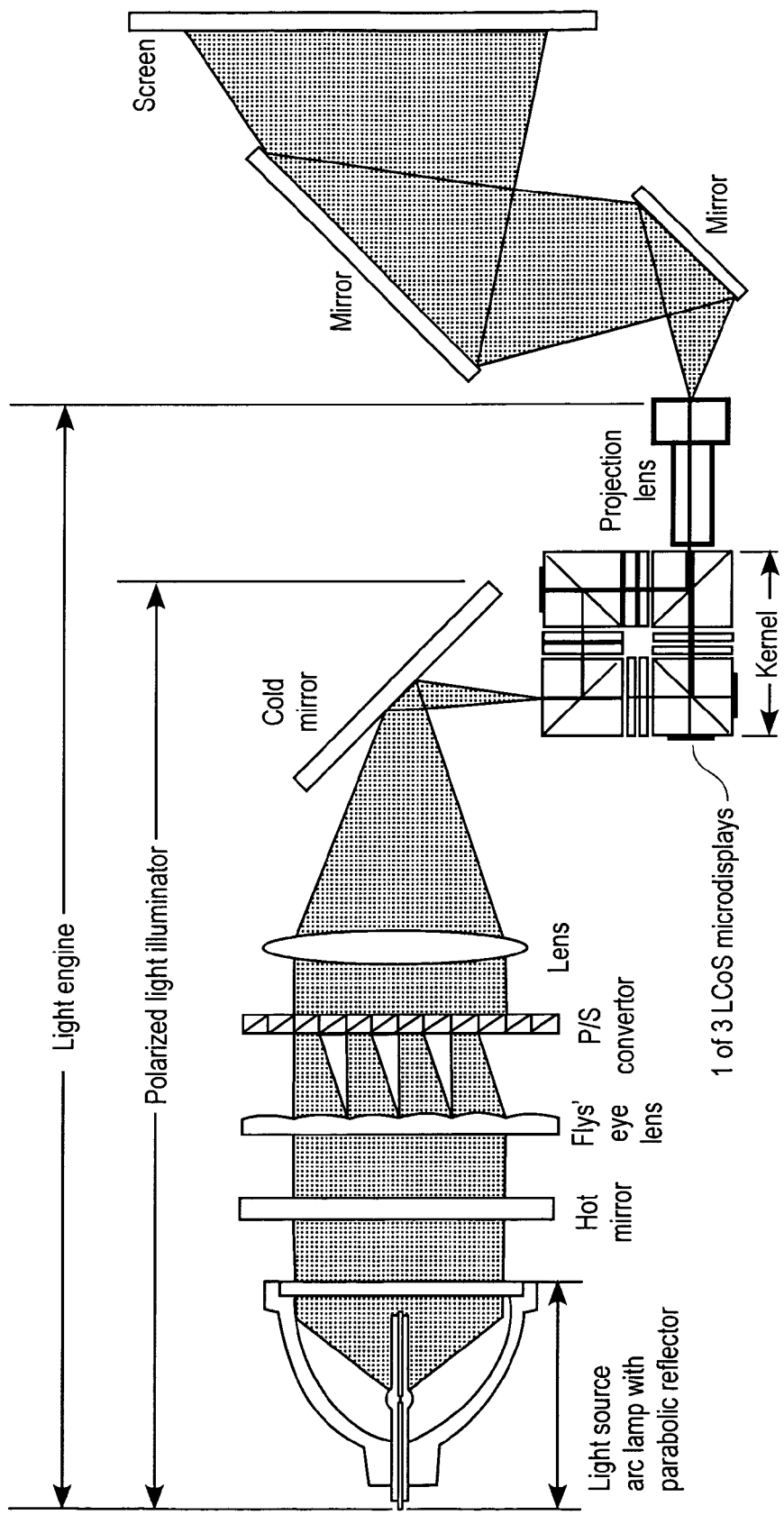
FIG. 1 is a drawing of a light engine configuration incorporating a Lightmaster Systems (LMS) AT Kernel.
Figure 2:
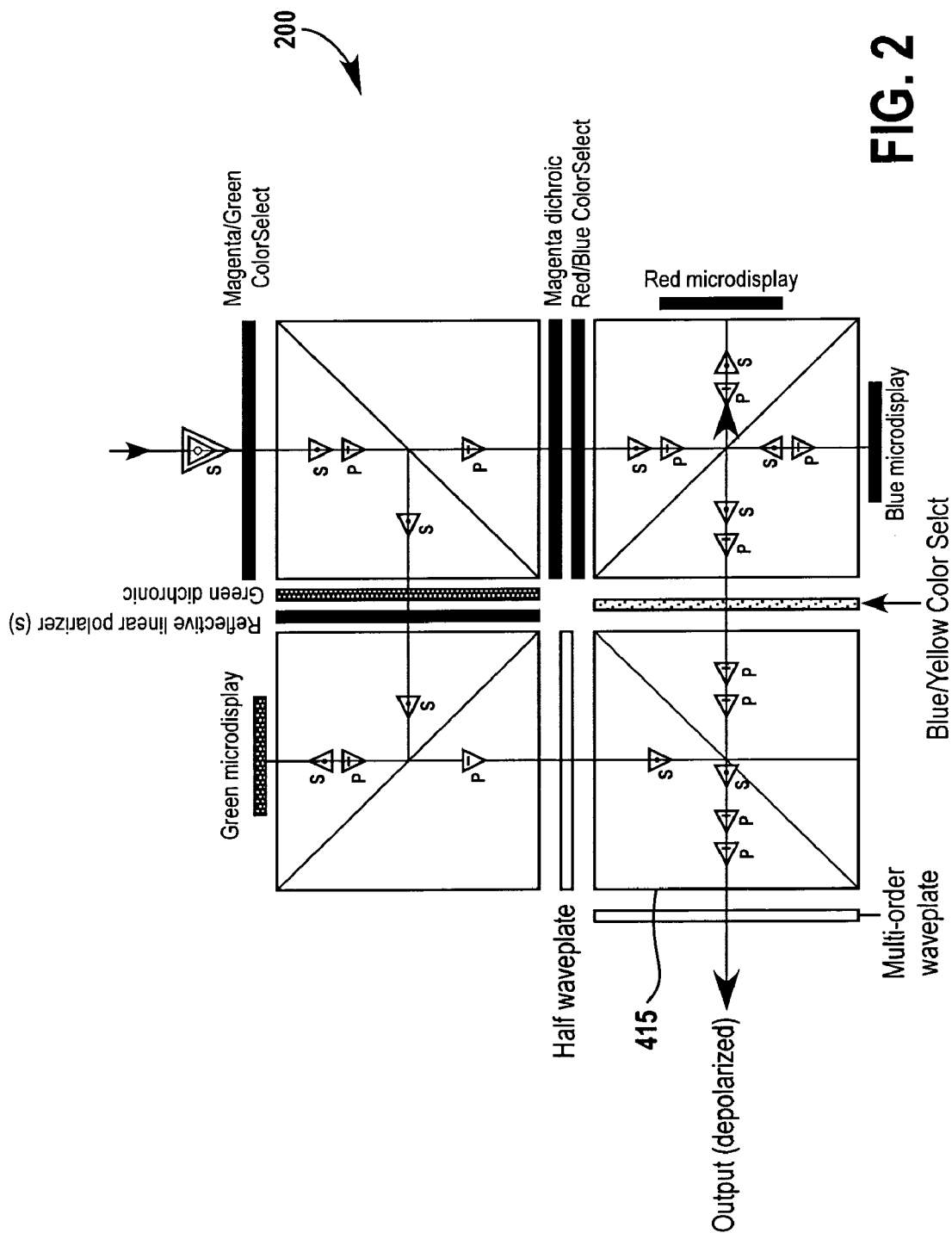
FIG. 2 is a drawing of an embodiment of the LMS AT Kernel.

Referring now to the drawings, wherein like reference numerals designate identical or corresponding parts, and more particularly to FIG. 1 thereof, there is illustrated a drawing of a light engine configuration incorporating a Lightmaster Systems (LMS) AT Kernel. FIG. 2 is a drawing of an embodiment of the LMS-AT Kernel 200. FIG. 2 also illustrates the method of light management within the LMS-AT kernel 200. Specifically noted are the color and polarization of the light at principle points within the kernel 200. Note that, at the output 415 of the prism assembly, the green light is linearly polarized in the S orientation while the red and the blue light are both linearly polarized in the P orientation. In the unmodified LMS-AT kernel 200 a multi-order waveplate is positioned at the output of the prism assembly to depolarize the output light. The rationale behind the use of the multi-order waveplate is provided in a pending U.S. application entitled "Method and Apparatus for Light Homogenization Using a Multi-Order Waveplate" by Berman submitted on Nov. 15, 2004 and assigned application Ser. No. 11/010,118, which is incorporated herein by reference in its entirety.

Figure 3:
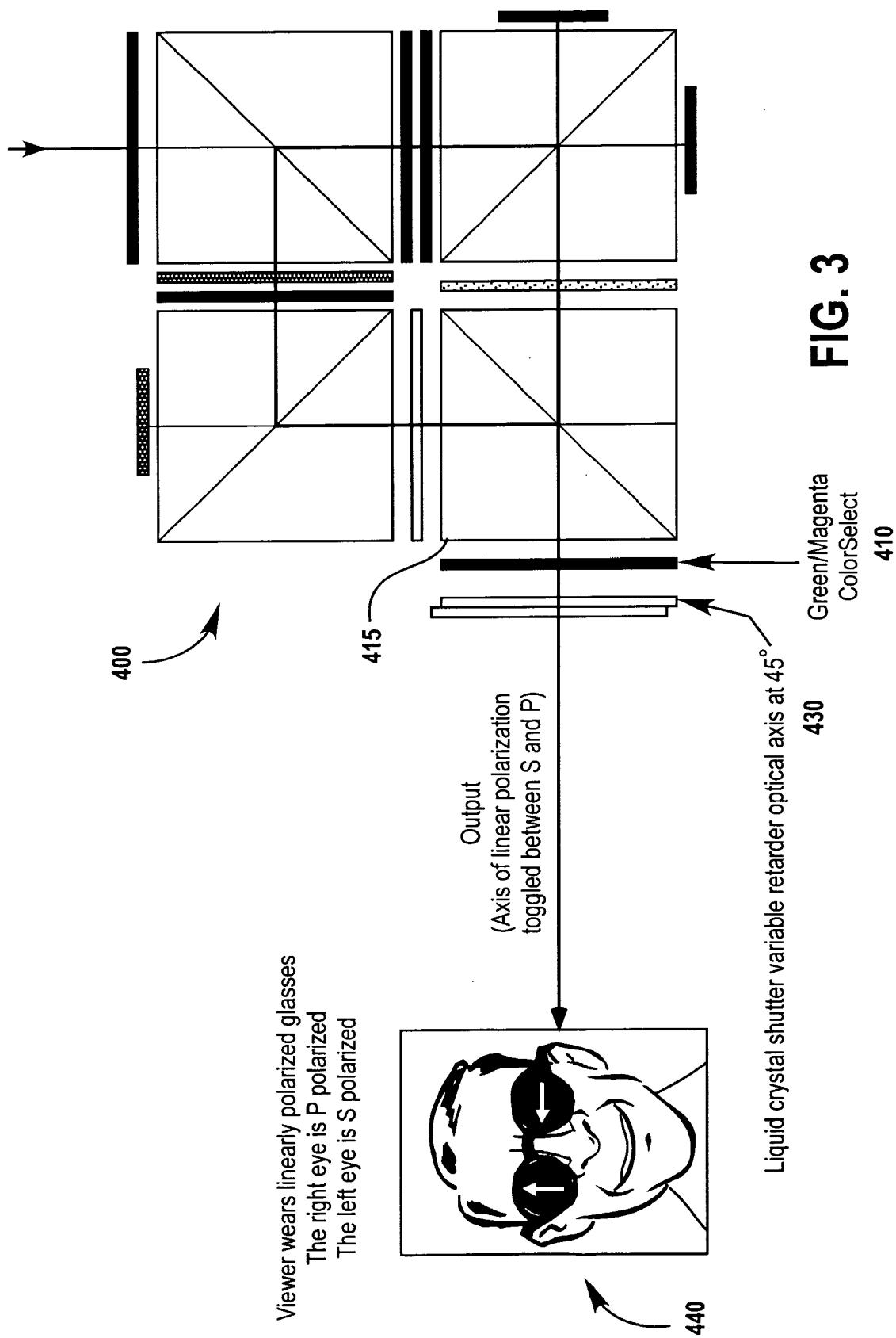
FIG. 3 is a drawing of a Kernel 400 modified according to an embodiment of the present invention.

FIG. 3 is a drawing of a Kernel 400 modified according to an embodiment of the present invention. The modified Kernel 400 is a stereoscopic configuration, the multi-order waveplate has been removed and replaced by a green/magenta wavelength specific retarder material 410 such as the Color Select product available from ColorLink Corporation. The result is that light leaving the modified kernel through the material 410 will be linearly polarized in the S orientation. In optical series is a shutter 430 that acts as a two state, electrically switchable variable retarder. In one embodiment, the value of the retardation in a first state of the shutter is 0 lambda and in a second state the retardation is ½ lambda. An optical axis of the retardation of the shutter 430 is oriented 45° to that of the axis of the linearly polarized light exiting the wavelength specific retarder 410 of the kernel. The shutter 430 quickly switches from one state to the other. In a 60 left eye/60 right eye frames per second system, the sum of the on and off times is no more than a few milliseconds.

In the 0 lambda state, the shutter has no effect on the state of polarization of the output light. The axis of linear polarization remains in the S orientation. In the ½ lambda state the shutter acts to rotate the axis of linear polarization to the P orientation. A stereoscopic application, the output of the light engine is toggled by the shutter 430 between P and S polarizations and synchronized with right eye and left eye imagery (e.g., controller 557, FIG. 5, for example, performs polarization and imagery synchronization). Based on this alternating polarization/imagery output, there are several configurations of the optical system to implement stereoscopic viewing.

A viewer wears a form of polarized glasses 440 in which the polarization of one lens is orthogonal to that of the other. These system optical configurations are discussed below.

Regarding the variable retarder component: several types of liquid crystal shutters are known to meet the stated requirements. Included are the 90° and 270° twisted nematic, the 0° and 180° surface mode devices in single cell and push/pull configurations, ferroelectric and VAN mode shutters. Conventional versions of all these shutters, those using rubbed type alignment layer has been developed and is currently in use to manufacture VAN mode LCOS microdisplays. In one embodiment, the shutter 430 utilizes an evaporative inorganic element.

The Color Select 410 and the shutter 430 can be separate optical components located at the output of the kernel 400. The ColorSelect 410 or both the ColorSelect 410 and the shutter 430 can be mounted to an output face 415 of the kernel 400. As an alternative, we note that, if a reason exists, these components can be placed at the output 565A of the projection lens 565.

In the case illustrated in FIG. 3 the viewer wears glasses 440 in which the axis of linear polarization of the left eye is in the S orientation and the right eye in the P orientation.

Figure 4:
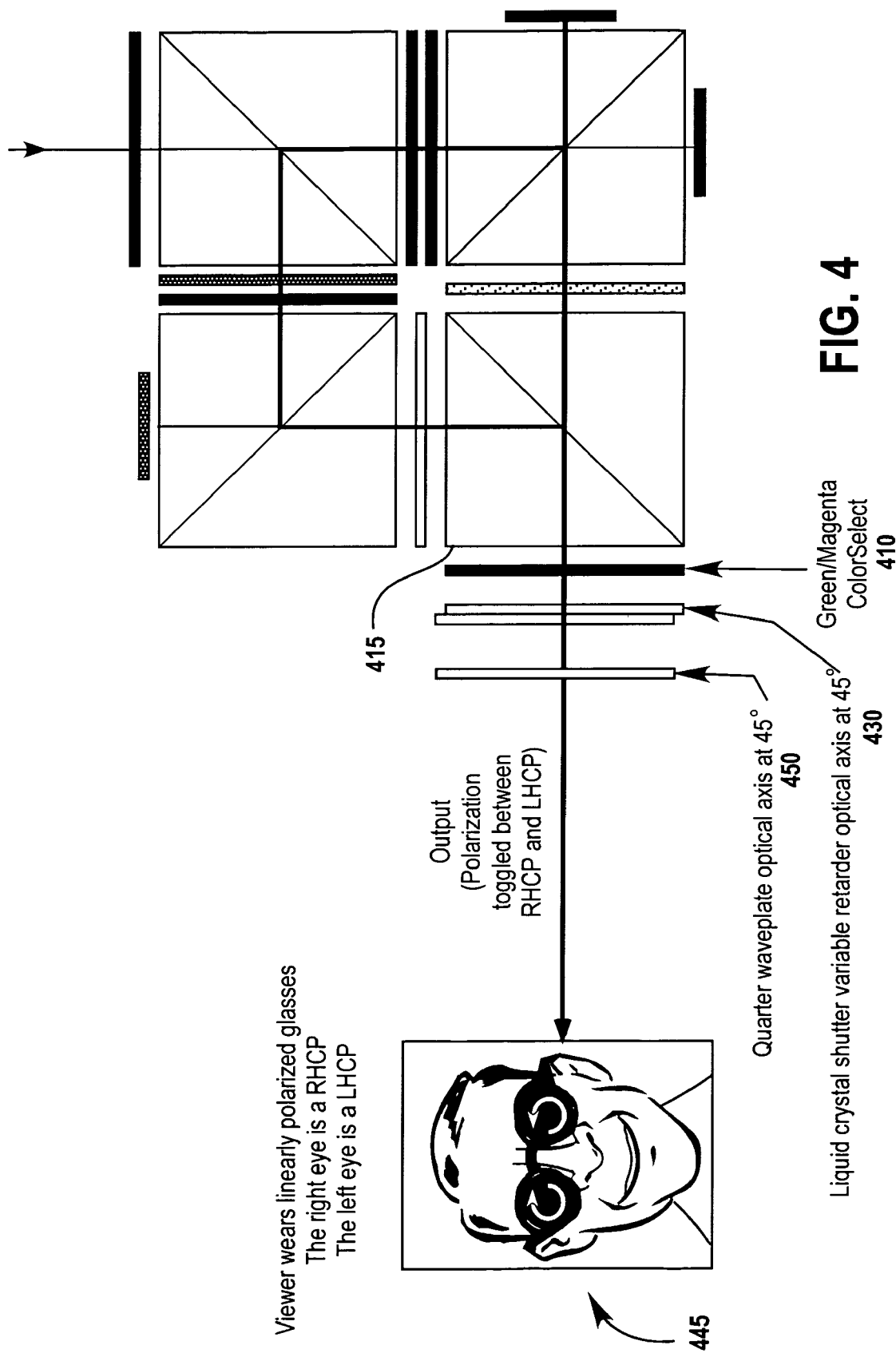
FIG. 4 is a drawing of a Kernel modified according to an embodiment of the present invention.

In another optical system configuration illustrated in FIG. 4, a quarter waveplate 450 is included in optical series with the output of any of the variable retarders discussed above. The axis of the quarter waveplate 450 is oriented parallel to that of the variable retarder (In this way the axis of the quarter waveplate is oriented 45° to that of the S and P linearly polarized light transmitted by the variable retarder). The result is that the light projected by the light engine is toggled between left handed and right handed circular polarizations. In this case the lenses of glasses 445 worn by the viewer are right handed and left handed circular polarizers. The advantage of this approach is minimization of contrast ratio variations as a consequence of "head tipping" (when a viewer "tips" his/her head).

The present invention includes all configurations of the described system components or other components that function similarly. A number of combinations in and orientation of system exemplar components are summarized in Table #1.

Figure 5:
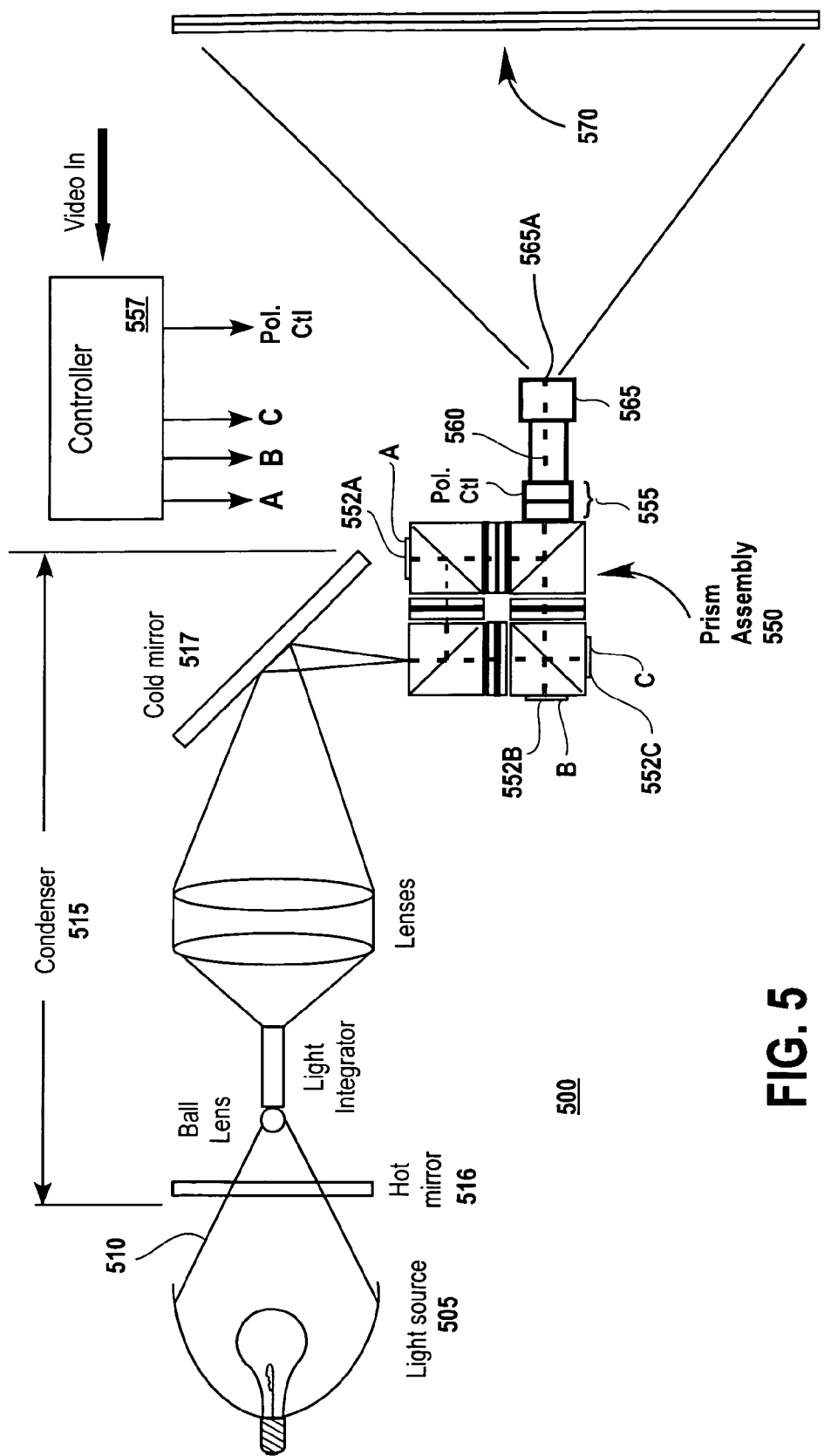
FIG. 5 is a drawing of a light engine incorporating a 3D module according to an embodiment of the present invention.

| TYPE OF WAVELENGTH SPECIFIC RETARDER | AXIS OF THE VARIABLE RETARDER | AXIS OF THE QUARTER WAVEPLATE | POLARIZATION OF THE GLASSES | |
|---|---|---|---|---|
| | | | RIGHT EYE | LEFT EYE |
| Magenta/Green | +45° | None | S-linear | P-linear |
| (All light is S-polarized) | −45° | None | S-linear | P-linear |
| | +45° | +45° | RHCP | LHCP |
| | +45° | −45° | LHCP | RHCP |
| | −45° | +45° | RHCP | LHCP |
| | −45° | −45° | LHCP | RHCP |
| | Push/Pull | None | RHCP | LHCP |
| | | +45° | S-linear | P-linear |
| | | −45° | P-linear | S-linear |
| Green/Magenta | +45° | None | P-linear | S-linear |
| (All light is P-polarized) | −45° | None | S-linear | P-linear |
| | +45° | +45° | LHCP | RHCP |
| | +45° | −45° | RHCP | LHCP |
| | −45° | +45° | LHCP | RHCP |
| | −45° | −45° | RHCP | LRHCP |
| | Push/Pull | None | LHCP | RHCP |
| | | +45° | P-linear | S-linear |
| | | −45° | S-linear | P-linear | organic alignment layers can be suitable in the video projector application. None-the-less, this application is clearly a high light intensity environment. As a consequence, an evaporated inorganic alignment may be particularly suitable for the 3D shutter application since it is exceptionally photo stable. This FIG. 5 is a diagram of a video projection system 500 having polarization switching device 555 according to the present invention. As shown in FIG. 5, white light 510 is generated by a light source 505. The light is collected, homogenized and formed into a proper shape by a condenser 515. UV and IR components are eliminated by filters (e.g., hot/cold mirrors 516/517). The white light 510 then enters a prism assembly 550 at an input face of the prism assembly. The white light 510 is broken into component light beams (e.g., red, green and blue light beams) by the prism assembly 550. The individual beams are broken down based on polarization, color separation, or other techniques, based on properties of the beam splitting layer(s) in the prism assembly (e.g., diagonal lines in beam splitters of the prism assembly).

A set of reflective microdisplays 552A, 552B, and 552C are provided and positioned to correspond to each of the component light beams (the prism assembly 550 with the attached microdisplays is called a kernel). The component light beams follow paths (light channels) within the prism assembly 550 such that each beam is directed to a specific reflective microdisplay. The microdisplay that interacts with (reflects) the green beam modulates the green content of a full color video image. The green beam reflected from the "green" microdisplay then contains the green content of the image (e.g., full color video). Similarly, blue and red content of the image is modulated into the blue and red light beams by the "blue" and "red" microdisplays. On a pixel by pixel basis, the microdisplays modulate and reflect the component light beams. The prism assembly 550 then recombines the modulated beams into a modulated white light beam 560 that contains the full color image. The resultant modulated white light beam 560 exits the prism assembly 550 and enters the polarization switching device 555. After polarization switching, the light beam 560 enters the projection lens 565. Finally, the image-containing beam (white light beam 560 that has been modulated and polarization switched) is projected onto a screen 570.

The polarization switching device is, for example, a combination of a wavelength specific retarder (WSR) and an electronic shutter switchable between to retardation states that implement the polarizations. The specific wavelengths of the WSR depend on the design of the kernel and are selected to produce a homogenous output polarization which can then be switched to alternative homogeneous polarizations. A controller 557 produces a polarization control signal (Pol. Ctl) that controls the polarization switching. The polarization control signal is input to the polarization switching device (e.g., input to the electronic shutter portion of the switching device) and triggers the changes in polarization. As illustrated, the switching device may be two main components (e.g., WSR and shutter) in close proximity, or grouped as a single unit, or separate components located at different points in the output image chain.

The above described video projection system having 3D capability may be utilized in television sets, HDTV televisions, monitors, computer monitors, display systems, home entertainment systems, presentation projectors, and the like.

Prism assemblies are commercially available in many varying configurations. The present invention includes any such configurations utilizing a polarization switching mechanism whether implemented in an electronic shutter or another device capable of changing polarizations at a sufficient rate. Example additional configurations include, but are not limited to, the various quad style configurations described in Berman et al. U.S. patent application Ser. No. 10/342,219, now issued as U.S. Pat. No. 6,909,556, filed Jan. 13, 2003, and entitled "Design of Prism Assemblies and Kernel Configurations for Use in Projection Systems," the contents of which are incorporated herein by reference in their entirety. U.S. Pat. No. 6,909,556 describes a prism assembly arranged in four quadrants, comprising, an input face on the first quadrant, a first face and a second face on the second quadrant, an output face on the third quadrant, and a third and a fourth face on a fourth of the four quadrants; wherein: one of the four faces has an attached red microdisplay; one of the four faces has an attached green microdisplay; one of the four faces has an attached blue microdisplay; the prism assembley includes optical components that faciliate the division of light entering the prism assembly through the input face into component red, green, and blue light beams that are individually directed to a corresponding one of the red, green and blue microdisplays where the light beams are reflected and then directed to the output face; each quadrant comprises a pathlength matched beamsplitter arranged in a pathlength matched position in the prism assembly; and at least one of the pathlength matched beamsplitters comprises two prisms mated together with over lapping corners, wherein an amount of overlap in the overlapping corners is directly proportional to pathlength differences through each of the prisms. In yet another embodiment, the prism assembly may include a fourth color channel.

Figure 6:
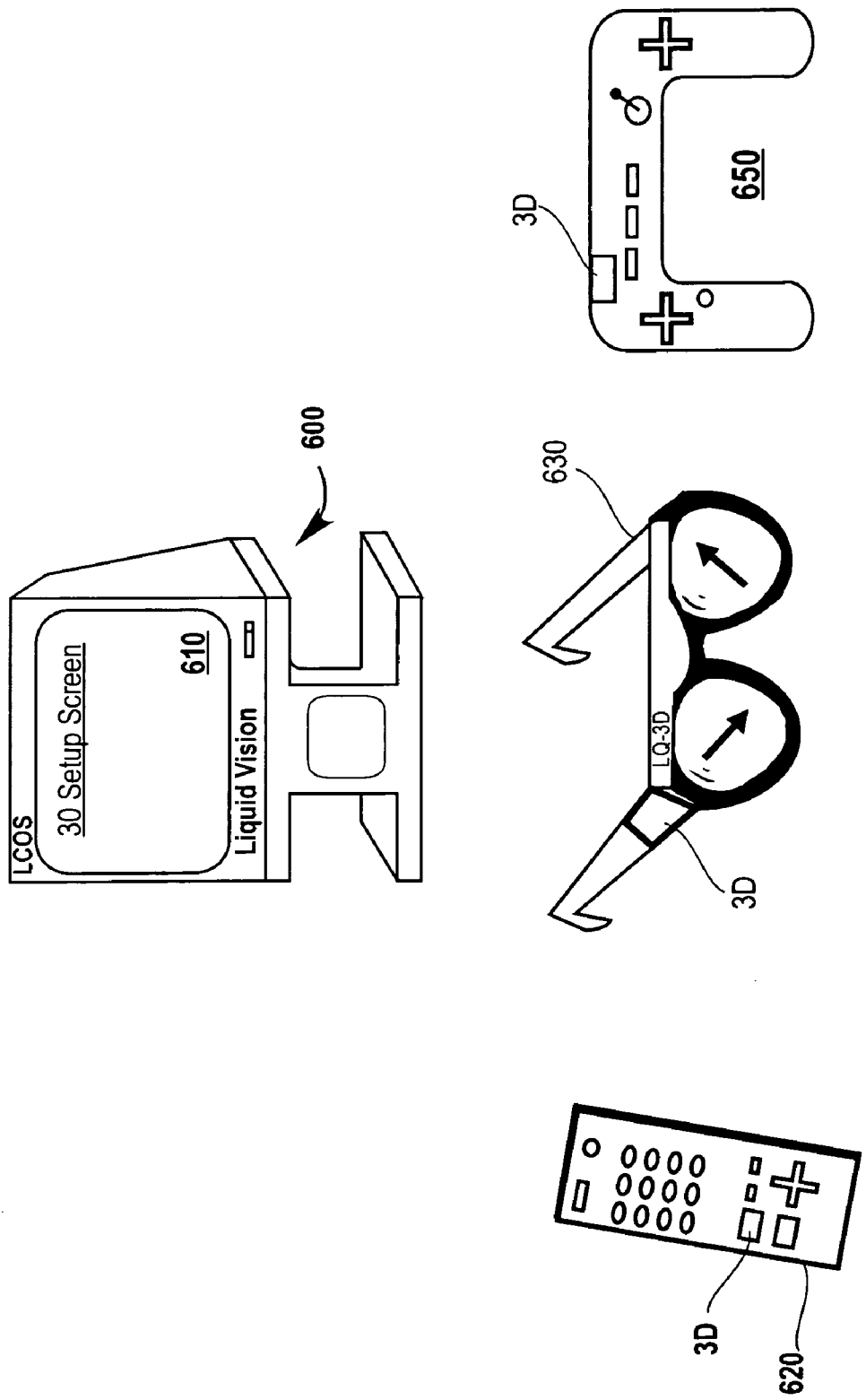
FIG. 6 is an illustration of a High Definition (HD) Rear Projection Television (RPTV) with gaming and other options according to embodiments of the present invention.

FIG. 6 is an illustration of a High Definition (HD) LCOS Rear Projection Television (RPTV) 600 with gaming and other options according to an embodiment of the present invention. The HD LCOS RPTV 600 is, for example, a television incorporating a LightMaster Systems™ (LMS™) LiquidVision™ kernel, or other kernel based on any of various LCOS and other modulation technologies maintained inside the television enclosure.

Options for the set-up of 3D capability (e.g., manual toggle, auto detect, etc) are provided in a screen controllable via a remote 620 or game controller 650. The HD LCOS RPTV 600 includes wireless capability consistent with infrared, bluetooth, and/or IEEE 802.11 technologies. Game controller 650 includes similar wireless capabilities to communicate with the television and/or gaming box maintained in the television enclosure, or within a base of the television enclosure, or located externally. The remote control 620 and game controller 650 include 3D buttons to toggle between 3D and regular television modes.

A pair of polarized glasses 630 has lenses that are orthogonally polarized with respect to each other. In one embodiment, the glasses 630 also include a 3D toggle button. The 3D toggle buttons operate, for example, with a short press—turns 3D on/off, long press—enters 3D set up screen. A Video In signal includes, for example, data consistent with both standard and 3D video that is selected by the controller (e.g., controller 557) based on whether 3D is on or off. In another embodiment, a standard video is processed to have a 3D effect. In yet another embodiment, the video in signal is from a gaming device that also coordinates with the 3D toggle switches and provide either a standard or 3D imagery consistent with the current operating mode.

The 3D toggle button wirelessly coordinates with, for example, the controller 557 to initiate/stop provision of 3D imagery to the microdisplays and switching of the polarization switching mechanism. In one embodiment, when not in 3D mode, a multi-order waveplate (not shown) is provided to de-polarize the projected image prior to projection onto the screen 570. The multi-order waveplate is inserted or removed via mechanical levers and/or a solenoid upon pressing the 3D button.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. For example, when describing a wavelength specific retarder, a Color Select material is noted, but other devices, including certain compensated higher order waveplates (e.g., see Berman et al., U.S. patent application Ser. No. 10/371,835, entitled "METHOD AND APPARATUS FOR USE AND CONSTRUCTION OF COMPENSATED HIGHER ORDER WAVEPLATES", filed Feb. 20, 2003, which is incorporated herein by reference in its entirety, or any other device having an equivalent function or capability, whether or not listed herein, may be substituted therewith. Furthermore, the inventors recognize that newly developed technologies not now known may also be substituted for the described parts and still not depart from the scope of the present invention. All other described items, including, but not limited to waveplates, polarization shutters, kernels, microdisplays, wireless communications, networks, etc should also be consider in light of any and all available equivalents.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, CDRW+/−, micro-drive, and magneto-optical disks, ROMs, RAMs, EPROMs, EEPROMs, DRAMs, VRAMs, flash memory devices (including flash cards, memory sticks), magnetic or optical cards, MEMS, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, synchronization of left and right side images to a corresponding polarization state, controlling an electronic shutter in time with images, inserting and removing multi-order waveplates, etc, communicating with 3-D accessories for activation of 3-D capabilities according to the devices and processes of the present invention.

The present invention may suitably comprise, consist of, or consist essentially of, any of element (the various parts or features of the invention, e.g., wavelength specific retarders, waveplates, prism assemblies, microdisplays, projectors, user accessories, controllers, and their equivalents. Further, the present invention illustratively disclosed herein may be practiced in the absence of certain elements, whether or not specifically disclosed herein. Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A device, comprising:
a kernel configured for use in an image projection system including:
a prism assembly arranged in four quadrants, including:
an input face on the first quadrant;
a first face and a second face on the second quadrant;
an output face on the third quadrant, and
a third and a fourth face on a fourth of the four quadrants
wherein:
one of the four faces has an attached red microdisplay;
one of the four faces has an attached green microdisplay;
one of the four faces has an attached blue microdisplay;
optical components that facilitate the division of light entering the prism assembly through the input face into component red, green and blue light beams that are individually directed to a corresponding one of the red, green, and blue microdisplays where the light beams are reflected and then directed to the output face;
each quadrant includes a pathlength matched beamsplitter arranged in a pathlength matched position in the prism assembly; and
at least one of the pathlength matched beamsplitters includes two prisms mated together with over lapping corners, wherein an amount of overlap in the overlapping corners is directly proportional to pathlength differences through each of the prisms;
an optical element to homogenize polarizations in an output light channel of the kernel; and
a polarization shutter in optical series with the optical element and configured to switch between a first retardation state and a second retardation state.

2. The device according to claim 1, wherein the kernel is a Liquid Crystal On Silicon (LCOS) based kernel.

3. The device according to claim 1, wherein the polarization shutter is configured to switch between a 0 lambda retardation first retardation state and a ½lambda retardation second retardation state, lambda being an amount of retardation relative to the homogenously polarized light.

4. The projection system according to claim 1, wherein the optical element is a green wavelength specific retarder.

5. The projection system according to claim 1, further comprising a control system coupled to the polarization shutter and configured to send a signal to the polarization shutter instructing the polarization shutter to change the polarization shutter in synchronization with changing properties of a projection produced by the projection system.

6. The projection system according to claim 5, wherein the changing properties of the projection produced by the projection system comprises a left-eye image and a right-eye image.

7. The projection system according to claim 5, wherein the changes in shutter comprises the shutter being in a first retardation state during projection of a right-eye image and the shutter being in a second retardation state during projection of a left-eye image.

8. A Liquid Crystal On Silicon (LCOS) projection system, comprising:
- a kernel, including a prism assembly arranged in four quadrants, including:
  - an input face on the first quadrant;
  - a first face and a second face on the second quadrant;
  - an output face on the third quadrant, and
  - a third and a fourth face on a fourth of the four quadrants wherein:
    - one of the four faces has an attached red microdisplay;
    - one of the four faces has an attached green microdisplay;
    - one of the four faces has an attached blue microdisplay;
    - optical components that facilitate the division of light entering the prism assembly through the input face into component red, green and blue light beams that are individually directed to a corresponding one of the red, green, and blue LCOS microdisplays where the light beams are reflected and then directed to the output face;
- each quadrant includes a pathlength matched beamsplitter arranged in a pathlength matched position in the prism assembly; and
- at least one of the pathlength matched beamsplitters includes two prisms mated together with overlapping corners, wherein an amount of overlap in the overlapping corners is directly proportional to pathlength differences through each of the prisms;
- a wavelength specific retarder configured to homogenize polarizations in the output beam; and
- a polarization switching mechanism disposed in the homogenized output beam and configured to switch a polarization of the output beam; and
- a control mechanism configured to synchronize image data modulated by the microdisplays with a state of the polarization switching mechanism.

9. The LCOS projection system according to claim 8, wherein the polarization switching mechanism comprises an electronic variable retardation shutter.

10. The LCOS projection system according to claim 8, wherein the polarization switching mechanism comprises an electronically controlled shutter.

11. The LCOS projection system according to claim 8, further comprising a circular polarizing element disposed in series with the polarization switching mechanism.

12. The LCOS projection system according to claim 11, wherein the circularly polarizing element is a quarter waveplate.

* * * * *